(12) United States Patent
Atkins et al.

(10) Patent No.: US 9,584,786 B2
(45) Date of Patent: Feb. 28, 2017

(54) GRAPHICS BLENDING FOR HIGH DYNAMIC RANGE VIDEO

(71) Applicant: Dolby Laboratories Licensing Corporation, San Francisco, CA (US)

(72) Inventors: Robin Atkins, Campbell, CA (US); Eldon Lee Rivers, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/937,128

(22) Filed: Nov. 10, 2015

(65) Prior Publication Data

US 2016/0080716 A1 Mar. 17, 2016

Related U.S. Application Data

(63) Continuation-in-part of application No. 14/631,950, filed on Feb. 26, 2015, now Pat. No. 9,230,338.

(60) Provisional application No. 62/102,276, filed on Jan. 12, 2015, provisional application No. 61/948,413, filed on Mar. 5, 2014.

(51) Int. Cl.
*H04N 9/76* (2006.01)
*H04N 5/445* (2011.01)
*H04N 21/426* (2011.01)

(52) U.S. Cl.
CPC .......... *H04N 9/76* (2013.01); *H04N 5/44504* (2013.01); *H04N 21/42653* (2013.01)

(58) Field of Classification Search
CPC .......... H04N 21/42653; H04N 5/44504; G06T 11/60
USPC ............... 348/598, 597, 589, 584, 600, 441; 345/619, 629, 630
See application file for complete search history.

(56) References Cited

U.S. PATENT DOCUMENTS

| 8,593,480 B1 | 11/2013 | Ballestad et al. |
| 2014/0125696 A1* | 5/2014 | Newton ................. H04N 5/235 345/629 |
| 2015/0156469 A1 | 6/2015 | Qu |
| 2015/0245004 A1 | 8/2015 | Guo |

FOREIGN PATENT DOCUMENTS

WO 2014/130343 8/2014

* cited by examiner

*Primary Examiner* — Paulos M Natnael
*Assistant Examiner* — Jean W Desir (57) ABSTRACT

A method and system for merging graphics and high dynamic range video data is disclosed. In a video receiver, if needed, video and graphics are translated first into the IPT-PQ color space. A display management process uses metadata to map the input video data and the graphics from their own color volume space into a target blending color volume space by taking into consideration the color volume space of the target display.

14 Claims, 5 Drawing Sheets

GRAPHICS BLENDING FOR HIGH DYNAMIC RANGE VIDEO

CROSS REFERENCE TO RELATED APPLICATIONS

This patent application is a Continuation in Part (CIP) of U.S. patent application Ser. No. 14/631,950, filed on Feb. 26, 2015, which claims the benefit of priority from U.S. Provisional Patent Application Ser. No. 61/948,413, filed on Mar. 5, 2014, and U.S. Provisional Patent Application Ser. No. 62/102,276, filed on Jan. 12, 2015, each of which is incorporated herein by reference in its entirety.

TECHNOLOGY

The present invention relates generally to video images. More particularly, an embodiment of the present invention relates to blending graphics with high dynamic range video.

BACKGROUND

As used herein, the term 'dynamic range' (DR) may relate to a capability of the human psychovisual system (HVS) to perceive a range of intensity (e.g., luminance, luma) in an image, e.g., from darkest blacks (darks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable by short-term adaptation though a HVS. As used herein, EDR may relate to a DR that spans 5 to 6 orders of magnitude. Thus while perhaps somewhat narrower in relation to true scene referred HDR, EDR nonetheless represents a wide DR breadth.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using low bit-depth, non-linear luminance coding (e.g., 10-bits and logarithmic luminance coding), or high-precision (e.g., 16-bit) floating-point formats, such as the OpenEXR file format developed by Industrial Light and Magic.

Most consumer desktop displays support luminance of 200 to 300 cd/m² or nits. Most consumer HDTVs range from 300 to 1000 cd/m². Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1,000 nits to 5,000 nits or more). In general, the methods of the present disclosure relate to any dynamic range higher than SDR.

As used herein, the term "display management" denotes the processing (e.g., tone and gamut mapping) required to map an input video signal of a first dynamic range (e.g., 1000 nits) to a display of a second dynamic range (e.g., 500 nits). Examples of display management processes are described in PCT Application Ser. No. PCT/US2014/016304 (the '304 Application), filed on Feb. 13, 2014, "Display management for high dynamic range video," by R. Atkins el at., (published as WO/2014/130343) which is incorporated herein by reference in its entirety. Display management may be assisted or controlled by input metadata generated by the source of the incoming content and multiplexed into the coded bitstream.

In some use cases, incoming EDR video may also be blended by graphics of a third dynamic range (e.g., 100 nits) before being sent to the target display. As used herein, the term 'graphics' denotes any kind of imagery (e.g., menus, still pictures, vector graphics, video, and the like) that may be blended with a video signal. As appreciated by the inventors here, improved techniques for blending graphics with high dynamic range video are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods and systems for blending graphics and EDR video signals of different dynamic ranges are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the blending of SDR graphics with enhanced dynamic range (EDR) video. A video receiver accesses graphics data at a graphics dynamic range and an input video signal at a video dynamic range, wherein the video dynamic range is higher than the graphics dynamic range. The receiver determines a target display dynamic range. In an embodiment, if the target display dynamic range is higher than the graphics dynamic range but lower than the video dynamic range, then the receiver applies a receiver display management process to the input graphics data to generate output graphics data, wherein the display management process maps the input graphics data from the target display dynamic range to the video dynamic range. The receiver blends the output graphics data with the input video signal to generate a composite video signal at the video dynamic range. In one embodiment, the receiver outputs the composite video signal to the target display and the display management process of the target display maps the dynamic range of the composite video signal down to the dynamic range of the target display.

In another embodiment, a second receiver display management process maps the dynamic range of the composite video signal down to the dynamic range of the target display to generate a second output video to be transmitted to the target display.

In other embodiments, the receiver display management process maps both the input video signal and the graphics data to the dynamic range of the target display before blending them to generate the composite video signal.

In an embodiment, all blending is performed in a perceptually-quantized color space, like IPT-PQ.

Graphics Compositing

Temporal Metadata Transformation

Existing display and play-back devices, such as HDTVs, set-top boxes, or Blu-ray players, typically support signals of up to 1080p HD resolution (e.g., 1920×1080 pixels at 60 frames per second). For consumer applications, such signals are now typically compressed using a bit-depth of 8 bits per pixel per color component. Because of the 8-bit depth and the corresponding low dynamic range, such signals are typically referred to as signals with standard dynamic range (SDR).

As new television standards are being developed, such as Ultra-High Definition (UHD), it may be desirable to encode signals with enhanced resolution and/or enhanced dynamic range while allowing legacy decoders to still be able to receive and decode a version of the same signal with lower dynamic range (e.g., SDR). Assuming an incoming coded EDR video bit stream has been properly decoded, FIG. 1A depicts an embodiment of an example implementation of a display manager processor (100) for an EDR video receiver in a digital media player, for generating an EDR output signal for a target television or display (150).

Figure 1A:
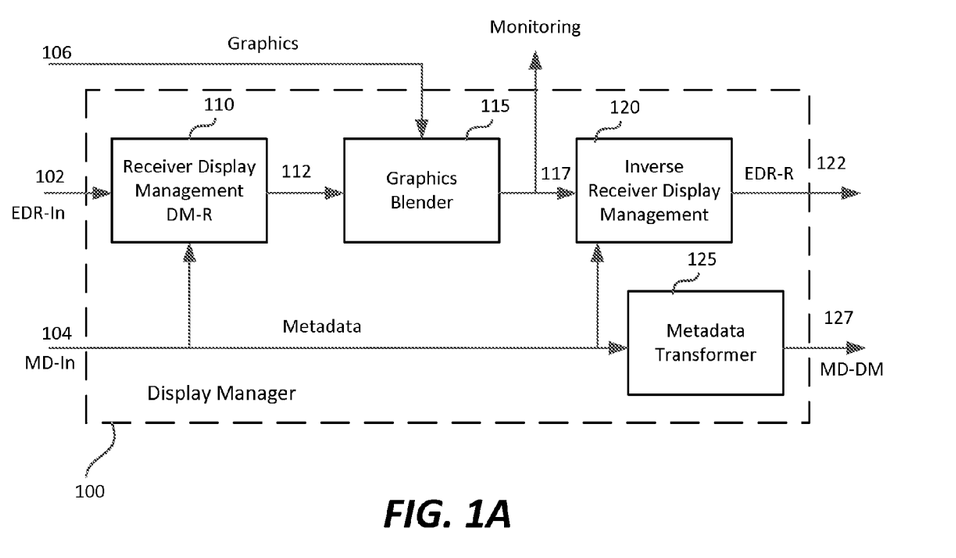
FIG. 1A and FIG. 1B depict an example implementation of a graphics compositing pipeline according to an embodiment of the present invention.
Figure 1B:
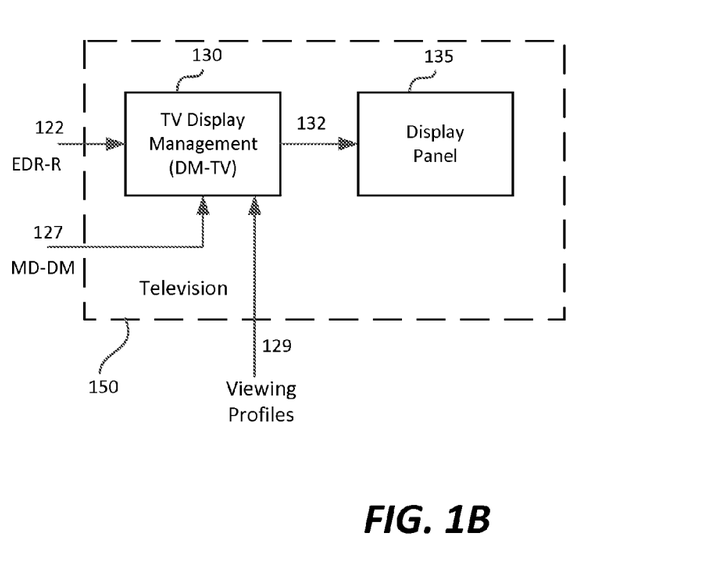

FIG. 1B depicts an embodiment of an example implementation of a television set (150) which may include its own display management processor (130) and a display panel (135). Given input EDR data (122) and metadata MD-DM (127), TV display management processor (130) adjust the luminance and color of the input data (122) to match the dynamic range and color gamut of the display panel (135). The TV display management process (130) may also be adjusted according to a TV viewing profile (129) selected by the user (e.g., 2D mode, 3D mode, movie mode, vivid mode, and the like) or other environmental parameters (e.g., ambient light).

As used herein, the term 'digital media player' denotes any device that receives digital media content (e.g., video, pictures, music, and the like) to play it back on a television, monitor, or other display. Examples of digital media players include set-top boxes, gaming machines (e.g., an Xbox), general purpose personal computers, tablets, or dedicated digital media receivers, such as the Apple TV or the Roku box.

As depicted in FIG. 1A, the display manager (100) receives EDR input (102) and optionally associated metadata (104) and graphics data (106). EDR input (102) may comprise part of a frame or a full frame of a sequence of images, such as an EDR video signal. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

The received EDR image (102) may be in an RGB color format or any other color space, such as YCbCr, XYZ, and the like. The received image may have been color graded on a reference EDR monitor which may have different dynamic range and color gamut characteristics than a target display monitor. As used herein, the term "color grading" denotes the process of adjusting the color of an image or video to correct color artifacts and/or to match the director's intent.

EDR input (102) may also include source display metadata (104) related to the display used to color grade the image during program production. For example, such metadata may include the reference electro-optical transfer function (EOTF) as defined by Recommendation ITU-R BT.1866 (March 2011). The EDR input may also include additional source display and content metadata, such as the maximum and minimum brightness of the source or reference display, the maximum, minimum, and average midtone of the data, and the intensity of ambient light during color grading. Content metadata may be adjusted on a per frame or a per scene basis, or whenever there is a change. If there are no metadata related to the source content, then in some embodiments such data may be extracted by analyzing the source video content. As used herein, the terms 'scene' or 'shot' denote a series of sequential-in-capture frames that may share the same overall brightness characteristics. Scene cuts may also be part of the input metadata.

In some embodiments, input graphics (106) (such as menus and other overlays) may be available in a legacy color space and dynamic range (e.g., Rec. 709 at 100 nits), which is different than the color space and dynamic range of the incoming EDR input (102). To make things more complicated, the dynamic range of the graphics in the receiver (100) may also be different than the maximum dynamic range supported by the display system (135) of the TV set (150).

As depicted in FIG. 1A, in an embodiment, blending of SDR graphics with EDR input data is performed in the SDR domain. In an embodiment, the receiver's display manager processor DM-R (110) maps the incoming dynamic range (e.g., 1000 nits) to the desired graphics or compositing dynamic range (e.g., 100 nits). In a preferred embodiment, the output (112) of this process is not clipped and therefore may contain illegal display values, such as negative values or values larger than a maximum allowable threshold. This is recommended to improve the accuracy of an inverse display management process (120) that will follow.

Graphics (106) and video data (112) are blended in graphics blender (115) to generate a composite video signal (117). In an embodiment, after appropriate clipping, the composite video signal (117) may be monitored on an external display (not shown). If the display management parameters in DM-R (110), used to create the composite signal (117), are the same as the display management parameters in DM-TV (130), used to generate signal (132) for a target display panel (135), then signal (117) may be transmitted directly to the display panel (135) and processing steps (120) and (130) may be bypassed or replaced by other video processing, such as video clipping. However, typically the DM-R and DM-TV display management processes may be in different devices (e.g., in a set-top box and a TV) or the TV may support a higher dynamic range than the dynamic range of the video receiver. In such cases, an inverse display management process (120) converts the SDR composite video signal (117) back to an EDR output signal, EDR-R (122). In a preferred embodiment, signals EDR-R (122) and EDR-In (102) have the same dynamic range; however, display manager (100) may generate output EDR-R (122) in any target dynamic range or color gamut. In an embodiment, display management processes (110), (120) and (130) may be implemented based on the tone-mapping and inverse tone-mapping methods described in the U.S. Pat. No. 8,593,480, "Method and apparatus for image data transformation," by A. Ballestad and A. Kostlin, (to be referred as the '480 patent), which is incorporated herein by reference in its entirety. An example of such an implementation is described in the '304 Application; however, alternative mapping techniques as known by a person of ordinary skill in the art may also be applied.

In some embodiments, because of the potential mismatch between the dynamic ranges of graphics blending and the panel range (e.g., blending at 100 nits versus displaying at 500 nits), graphics intensities and color values may 'jump' at scene cuts or even within the same scene. For example, the luminosity of a menu element may change when the background EDR video switches from one scene to another (e.g., from a bright scene to a dark scene or vice versa). Such perceptual jumps in tone-mapping (e.g., sudden changes in luminance or color) may be alleviated using, as depicted in FIG. 1A, a metadata transformer (125).

Consider again incoming EDR video signal (102) and its associated metadata MD-In (104). If there is no requirement for video compositing (e.g., blending the video with input graphics data (106)), then both video data (102) and metadata (104) may be passed to the TV with no transformation. If there is a requirement for video compositing, then in addition to the blending steps (110), (115), and (120) described earlier, a metadata transformer (125) may apply a temporal correction to the input metadata to alleviate perceptual jumps in tone-mapping changes.

Figure 2A:
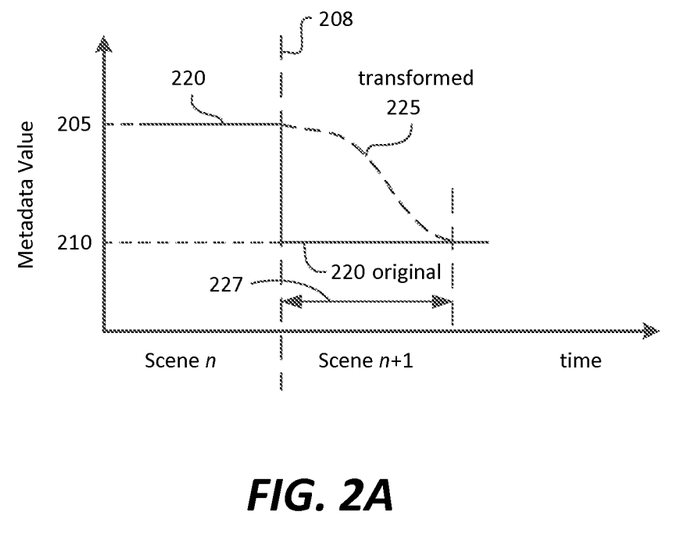
FIG. 2A and FIG. 2B depict an example metadata transformation process according to an embodiment of the present invention.

FIG. 2A depicts an example of a metadata value (220) changing between two consecutive scenes (scene n and scene n+1). For example, the metadata value (220) may be the maximum luminance value in a scene, the minimum luminance value in the scene, or any other scene-related metadata value. As depicted in FIG. 2A, without limitation, at scene cut (208), the metadata value (220) transitions from a first value (205) to a second value (210). In an embodiment, metadata transformer (125) adjusts the input metadata (104, 220) so that the transition time (227) from the first value (205) to the second value (210) is extended to be larger than zero, that is, it is not instant. In some embodiments, the transformed metadata value (e.g., 255) may represent a smoother transition from the first value to the second value. In some embodiments, metadata value transformations may also be applied at other time intervals, not necessarily associated with a scene cuts.

In an embodiment, the metadata transformer comprises a low-pass filtering function. For example, such filtering helps prevent sudden jumps in the graphics. For example, for a first-order IIR filter, let $m_i(t)$ denote input metadata at time t, then the filtered metadata may be generated using $$m_o(t)=c1*m_o(t-1)+c2*m_i(t),$$

where c1, c2, are filter coefficients that add to 1.0 (e.g., c1=0.95, c2=0.05).

In another embodiment, the metadata transformer comprises an exponential increasing or decreasing function (e.g., $f(x)=Axe^{bt}$, where variables A and b control the rate of increase or decrease of input x over time t). A person with ordinary skill in the art will appreciate that there are variety of other linear or non-linear functions that can be applied to generate metadata value transitions. Regardless of the transformation function being used, only the metadata values (104) are transformed and not the video data (117 or 122) itself.

Figure 2B:
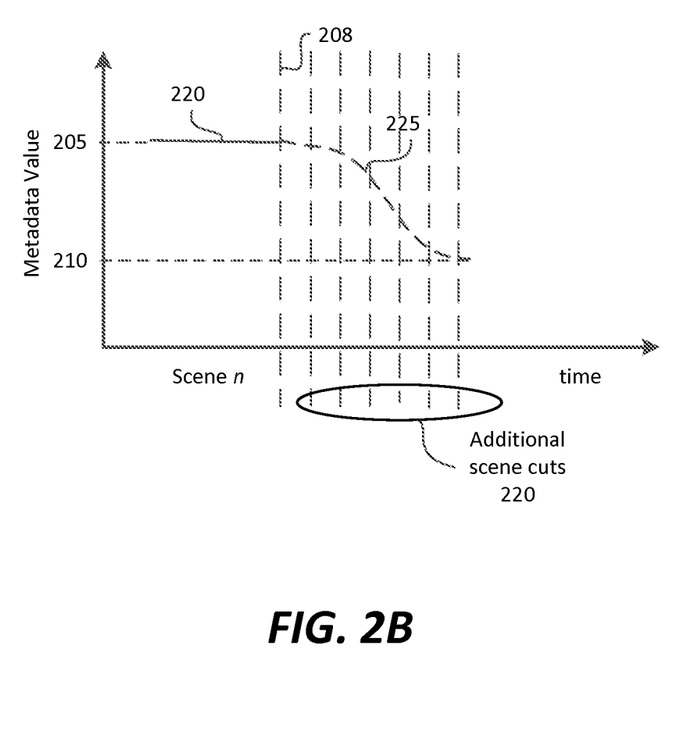

In an embodiment, as depicted in FIG. 2B, the metadata transformer may also insert markings for one or more additional scene cuts (220) between the original scene cut (208) and the time it takes for the transformed metadata value (225) to reach its end transitional value (210).

The transition interval (227) may be user defined, may depend on known human adaptation models, such as light or dark adaptation as a function of the contrast change between the two scenes, or it may be a function of any other parameter of the receiver or the display systems.

Blending in IPT-PQ Space

In a preferred embodiment, blending is performed in what will be referred to as the IPT-PQ color space; however, blending may also be performed in other color spaces, such as linear RGB, gamma RGB, YCbCr, XYZ, CIE-Lab, and the like. IPT, as described in "*Development and testing of a color space (ipt) with improved hue uniformity*", by F. Ebner and M. D. Fairchild, in Proc. 6$^{th}$ Color Imaging Conference: Color Science, Systems, and Applications, IS&T, Scottsdale, Ariz., November 1998, pp. 8-13 (to be referred as the Ebner paper), which is incorporated herein by reference in its entirety, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization may be based on the maximum luminance of the target display.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in U.S. Pat. No. 9,077,994 (to be referred to as the '994 Patent) titled "Device and method of improving the perceptual luminance nonlinearity-based image data exchange across different display capabilities," by J. S. Miller et al., and incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '994 patent, imitates the true visual response of the human visual system using a relatively simple functional model.

An example of an EOTF based on a PQ curve is defined in SMPTE ST 2084:2014 "High Dynamic Range EOTF of Mastering Reference Displays," which is incorporated herein by reference in its entirety. Another example of a perceptually-quantized EOTF is presented in "Chromaticity based color signals for wide color gamut and high dynamic range," by J. Stessen et al., ISO/IEC JTC1/SC29/WG11 MPEG2014/M35065, October 2014, which is incorporated herein by reference in its entirety.

Figure 3:
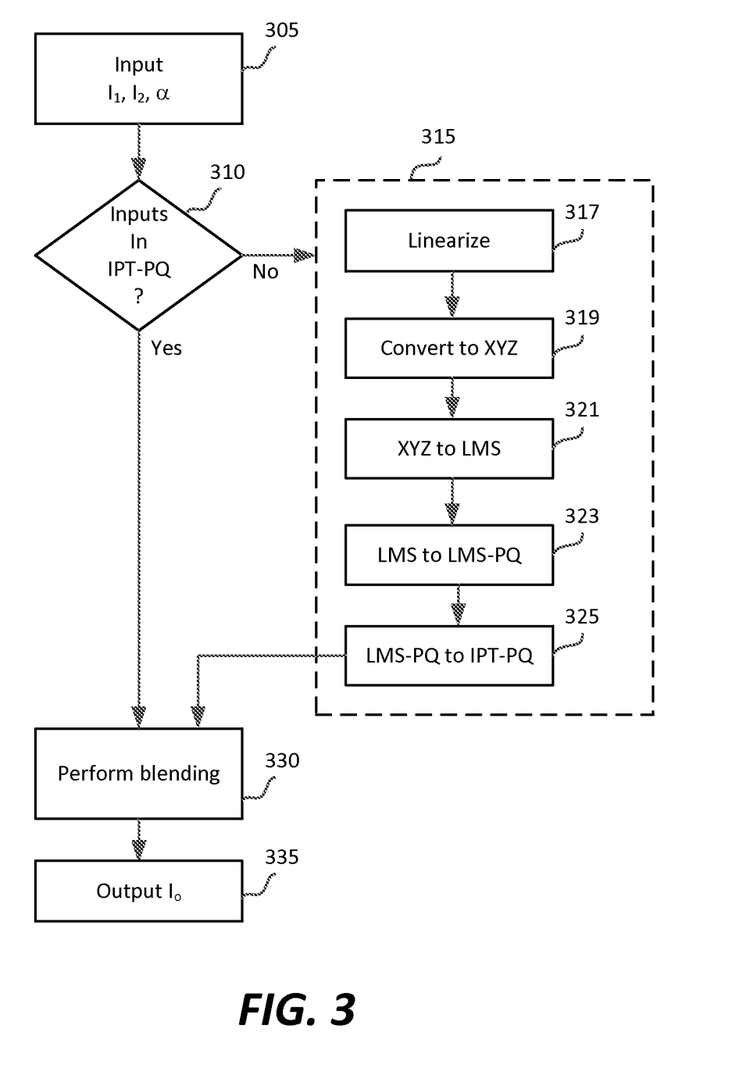
FIG. 3 depicts an example process of alpha blending according to an embodiment of the present invention.

FIG. 3 depicts an example process for performing alpha blending in an IPT-PQ color space according to an embodiment. As depicted in FIG. 3, consider inputs $I_1$ and $I_2$, and the desired alpha blend ($\alpha$) (305). If both inputs are in the IPT-PQ color space, then blending (330) may be performed directly on the two inputs to generate blended output $I_O$. For example $$I_O = \alpha I_1 + (1-\alpha) I_2.$$

In some embodiments, blending (330) may also incorporate any of the methods discussed earlier.

If any of the inputs is not in the IPT-PQ color space, then it is converted to IPT-PQ (315). Process (315) provides an example implementation process of translating an input from its original color (say, RGB gamma, RGB PQ, and the like) to the IPT-PQ color space.

In step (317), if needed, the input signal may be normalized first from its original range (e.g., 0 to 4095) into pixel values with the dynamic range between 0 to 1. Next, using the signal's EOTF or inverse EOTF (OETF) the input is linearized. For example, if the input signal is gamma coded, then this step applies an inverse gamma function. If the input signal is PQ-encoded according to SMPTE ST 2084, then this step applies an inverse PQ function. In practice, the normalization and the inverse non-linear encoding (317) steps may be performed using pre-computed 1-D Look-up tables (LUTs). This step may be skipped if the input is already in a linear color space.

Next (steps 319, 321), the input is converted to the LMS color space. This typically involves two steps: a) applying a 3×3 matrix to the linear color data to convert them to XYZ (319), followed by b) an XYZ to LMS color transformation (321).

In step (323), each LMS color component is transformed to a perceptually-coded LMS color space (LMS-PQ) by applying the desired perceptual EOTF (e.g., SMPTE ST 2084).

Finally, in step (325), using the standard LMS to IPT 3×3 linear transform, the LMS-PQ data are translated to the IPT-PQ color space.

Optimizing the Blending Color Volume Space

As used herein, the term "color volume space" denotes the 3D volume of colors that can be represented in a video signal and/or can be represented in display. Thus, a color volume space characterizes both luminance and color/chroma characteristics. For example, a first color volume "A" may be characterized by: 400 nits of peak brightness, 0.4 nits of minimum brightness, and Rec. 709 color primaries. Similarly, a second color volume "B" may be characterized by: 4,000 nits of peak brightness, 0.1 nits of minimum brightness, and Rec. 709 primaries.

As discussed earlier, when blending graphics and video signals, it is preferred that both signals are in the same color space, preferably, the IPT-PQ color space. Furthermore, it is desired that both signals map image and video values to the same color volume space. In an embodiment, the optimum color volume space is determined by taking into consideration the color volume space of the two inputs and the color volume space of the target display.

Figure 4:
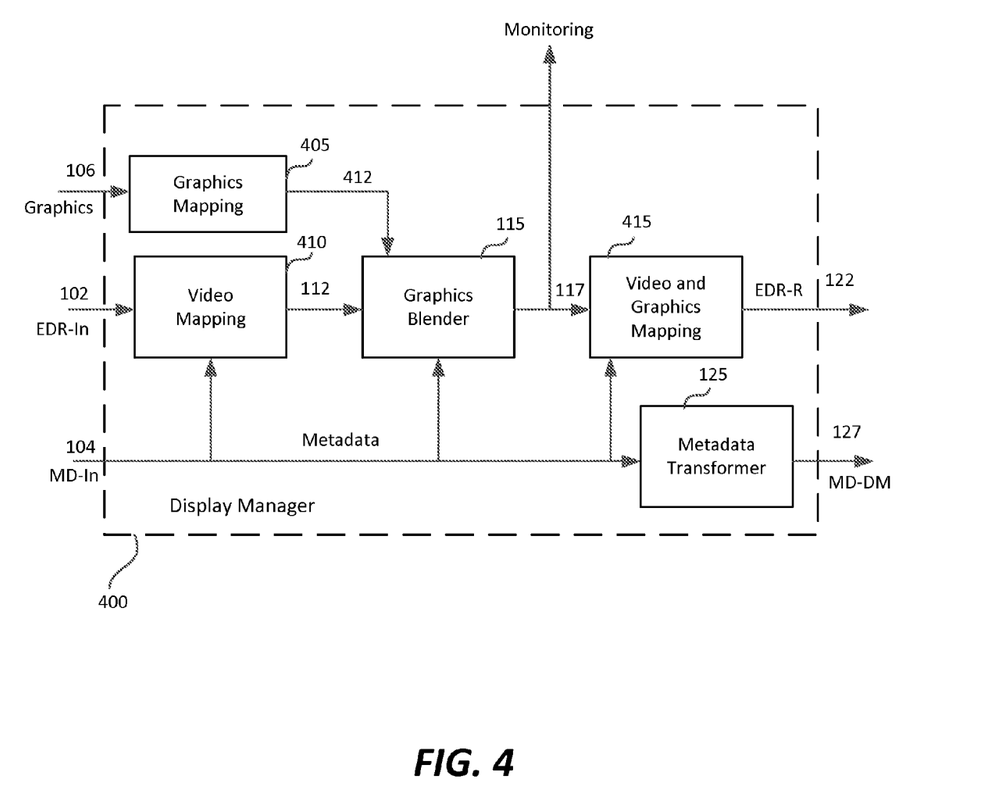
FIG. 4 depicts another example implementation of a graphics compositing pipeline according to an embodiment of the present invention.

As discussed earlier, in display manager (100) in FIG. 1A, before blending (115), the input EDR data (102) is always translated to match the dynamic range of the graphics (106). FIG. 4 depicts an example of an alternative embodiment, where the display manager (400) allows both the input video (102) and the graphics (106) to be mapped from their original color volume space to a common, optimized, color volume space.

Video mapping (410) unit performs the same operations as discussed earlier for the receiver display management unit (110). If needed, it translates the input to the IPT-PQ color space and then translates the input video dynamic range to the target blending dynamic range. Similarly, graphics mapping unit (405), if needed, translates the input graphics (106) to the IPT-PQ color space and then maps its dynamic range to the target blending dynamic space. As discussed earlier, dynamic range adjustments may be performed using the sigmoid mapping functions described in the '480 patent, which can easily be defined based on the min, mid., and max brightness values of the source signal and the target blending color volume space.

The video and graphics mapping unit (415) has similar functionality as the Inverse Receiver display management unit (120), except that it can adjust the dynamic range of the blended signal (117) both upwards and downwards according to the dynamic range of the target display (150). For example, if the blended signal (117) has a dynamic range of 4,000 nits and the display has a dynamic range of 1,000 nits, then unit (415) will apply tone-mapping to reduce the dynamic range. Similarly, if the blended signal (117) has a dynamic range of 500 nits and the display has a dynamic range of 1,000 nits, then unit (415) will apply inverse tone-mapping (or inverse display management) to increase the dynamic range. In a preferred embodiment, the graphics blending (115) is performed in the target volume so that video and graphics mapping (415) may be bypassed.

Figure 5:
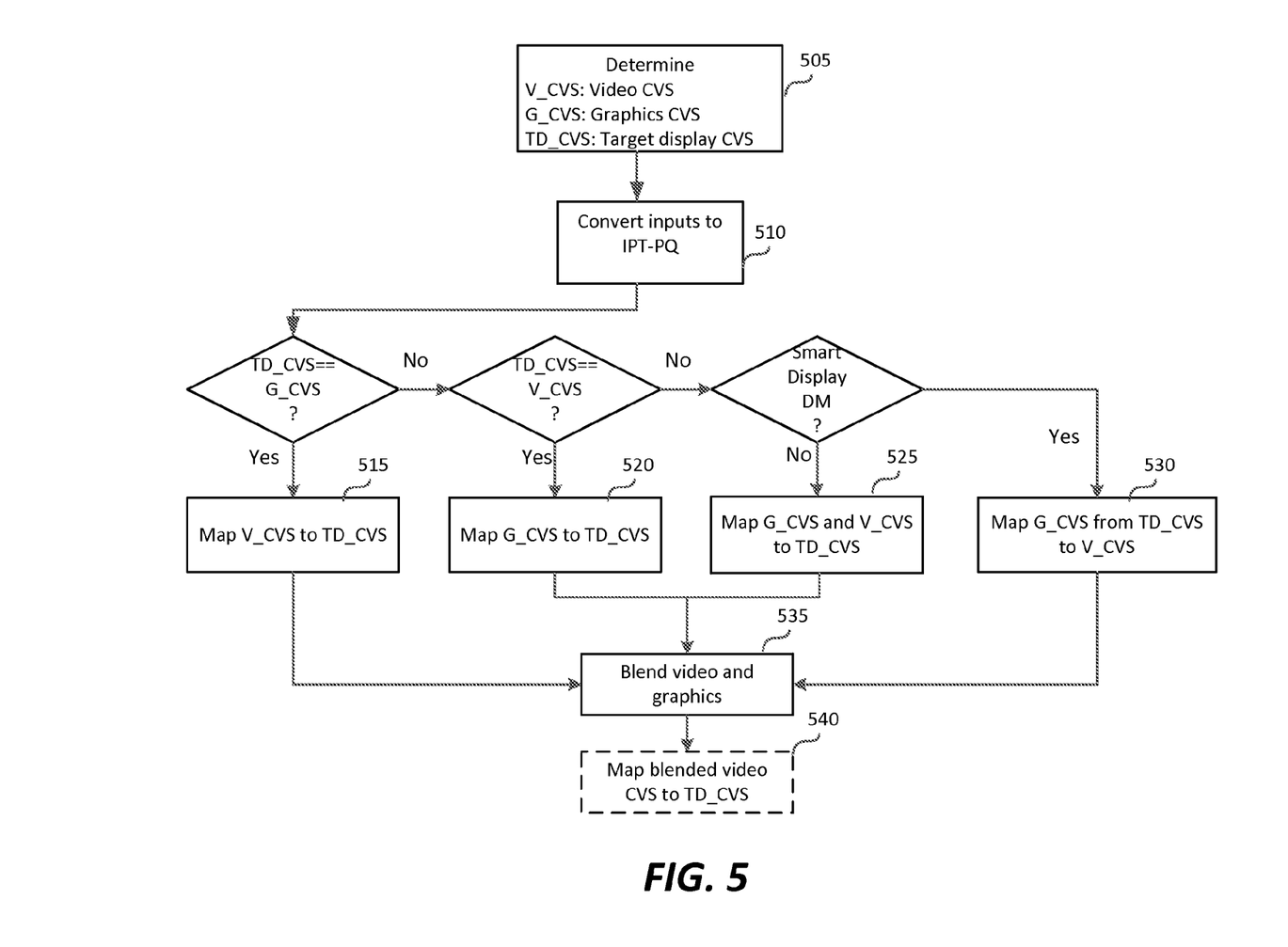
FIG. 5 depicts an example process for blending video and graphics according to an embodiment of the present invention.

In an embodiment, the optimum target blending color volume space is defined as the color volume space of the target display (150). For example, FIG. 5 depicts an example process for blending video and graphics depending on the relationship among the color volume spaces of the input video (V_CVS), the graphics (G_CVS) and the target display (TD_CVS).

The dynamic range of the target display matches the dynamic range of the graphics For example, consider now the case where in step (505) one determines:
- The video input was color graded at 4,000 nits, and is already in IPT-PQ color space
- The graphics input was color-graded at 100 nits and it is not in IPT-PQ color space
- The target display has maximum brightness of 100 nits;

Note, that for simplicity purposes, the minimum and or mid brightness levels for the inputs and the target display are not shown in these examples; however, they are typically taken into consideration when mapping signals from one color volume space to another. In an embodiment, the following operations may take place:
- Step (515): Using the video mapping unit (410), the input video is mapped from 4,000 nits down 100 nits
- Step (510): Using graphics mapping unit (405), the graphics input (106) is converted to the IPT-PQ color space and its output (412) remains at 100 nits
- Step (535): Signals 112 and 412 are blended using the graphics blender (115) to generate a blended output signal (117) at 100 nits
- Blended signal 117 may bypass unit 415 and is signaled to the display (150) as signal 122 (e.g., step (540) is bypassed).

The dynamic range of the target display matches the dynamic range of the video signal For example, consider now the case where in step (505) it is determined that:
- The video input was color graded at 2,000 nits, and is already in IPT-PQ color space
- The graphics input was color-graded at 200 nits and it is not in IPT-PQ color space
- The target display has maximum brightness of 2,000 nits;

then the following operations may take place:
- The video mapping unit (410) is bypassed and the input video (102) is provided to the graphics blender as signal (112)
- Steps (510 and 520): Using graphics mapping unit (405), the graphics input (106) is converted to the IPT-PQ color space and its output (412) is mapped to 2,000 nits
- Step (535): Signals 112 and 412 are blended using the graphics blender (115) to generate a blended output signal (117) at 2,000 nits
- Blended signal 117 may bypass unit 415 and is signaled to display 150 as signal 122 (e.g., step (540) is bypassed).

The dynamic range of the target display is in between the dynamic range of the video signal and the dynamic range of the graphics For example, without limitation, consider the following scenario:
- The video input was color graded at a high dynamic range (say, 4,000 nits)
- The graphics input was color graded at a standard dynamic range (say, 100 nits)
- The target display has a maximum brightness lower than the input, but higher than the graphics (say, 600 nits)

By determining the target blending color volume space to be equal to the target display color volume (e.g., 600 nits), the following operations may take place:
- Step (525): Using video mapping unit (410), the video input is mapped from 4,000 nits to 600 nits to generate signal 112
- Step (525): Using graphics mapping unit (405), the graphics input is mapped from 100 nits to 600 nits to generate signal 412
- Step (535): Signals 112 and 412 are blended using the graphics blender (115) to generate blended signal 117 at 600 nits
- Blended signal 117 may bypass unit 415 and is signaled to display 150 as signal 122 (e.g., step (540) is bypassed).

In all of the steps above, if needed, the video and graphics signals may be transformed to the IPT-PQ color space (e.g., via step (510)) before the dynamic range mapping steps.

In another embodiment (referred in FIG. 5 as the "smart display DM" path), if the target display supports its own dynamic range conversion (e.g., by using TV Display Management (130)), then video mapping (410) may be skipped by doing the following operations:
- The video mapping unit (410) is bypassed and the input video signal (102) is presented as video signal (112) to the graphics blender
- Step (530): Using graphics mapping unit (405), the graphics input is mapped from the max dynamic range of the target display (e.g., 600 nits) to the maximum dynamic range of the video signal (e.g., 4,000 nits) to generate signal 412. Note that graphics is not mapped from the graphics CVS (e.g., 100 nits) to the video CVS, but from the target display CVS (e.g., 600 nits) to the video CVS, due to a subsequent mapping in step (540).
- Step (535): Signals 112 and 412 are blended using the graphics blender (115) to generate blended signal 117
- Step (540): The video graphics mapping unit (415) or the display mapping processor of the target display (e.g., 130) will map the 4,000 nits blended signal down to 600 nits, effectively inverting the inverse mapping (600 to 4,000 nits) that was applied earlier to the graphics input (106).

In an embodiment, if there is no information for the target display, a typical display of 400 nits, using Rec. 709 may be selected.

Metadata Use Cases

As described earlier, the target display characteristics guide the video and graphics mapping stages 405 and 410. The same metadata should also guide any mapping by stages 415 or 130. Depending on the relative significance of the video and graphics data, two main cases are examined, although a "blend" or combination of the two is also possible.

A) Video data has higher priority. In this scenario, the graphics provide only simple information, such as closed captions, menu controls (play, pause, fast forward, etc.), and the like. Then, one needs to ensure that the metadata of the blended signal exceeds the range of the blended video to prevent clipping and crushing artifacts. For example, in an embodiment, the metadata of the blended signal may be computed as:

maxBlended=max(maxVideo, maxGraphics)
MinBlended=min(minVideo, minGraphics)
meanBlended=meanVideo where minX, meanX, and maxX (for X=(Blended (signal), (input) Video, and (input) Graphics) denotes the minimum, mean (or average), and maximum brightness of signal X. If no information is provided about the graphics signal characteristics, in an embodiment, one may assume that they cover the full range of standard dynamic range (e.g., 0.1 to 100 nits).

B) Graphics has higher priority. In this scenario, the user interface is the most important aspect of the display (e.g., channel selection menu with a small video preview). Then, in an embodiment, the metadata of the blended signal may be computed as:

maxBlended=max(maxVideoSourceDisplay, maxGraphicsSourceDisplay)
MinBlended=min(minVideoSourceDisplay, minGraphicsSourceDisplay)
meanBlended=meanVideoSourceDisplay where min and max values for a VideoSourceDisplay refer to the minimum and maximum brightness values of the display range that the video was mastered (e.g., 0.1 to 4,000 nits) and min and max values for a GraphicsSourceDisplay refer to the minimum and maximum brightness values of the display where the graphics was mastered (e.g., 0.1 to 100 nits).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to blending graphics with EDR video, such as those described herein. The computer and/or IC may compute any of a variety of parameters or values that relate to blending graphics with EDR video, as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to blending graphics with EDR video as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient blending of graphics with EDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a video receiver, a method for blending graphics data, the method comprising:
   receiving input graphics data at a graphics dynamic range;
   receiving an input video signal at a video dynamic range, wherein the video dynamic range is higher than the graphics dynamic range;
   determining a target display dynamic range;
   determining a relationship between the target display dynamic range and the graphics dynamic range or between the target display dynamic range and the video dynamic range, wherein upon determining that the target display dynamic range is higher than the graphics dynamic range but lower than the video dynamic range:
      applying a receiver display management process to the input graphics data to generate mapped graphics data, wherein the display management process maps the input graphics data from the target display dynamic range to the video dynamic range;
   blending the mapped graphics data with the input video signal to generate a composite video signal at the video dynamic range; and
   outputting the composite video signal.

2. The method of claim 1, further comprising:
   in a television set, receiving the composite video signal; and
   applying a TV display management process to the composite video signal to generate a target display signal at the target display dynamic range.

3. The method of claim 1, further comprising:
applying in the video receiver a second display management process to the composite video signal to generate a target display signal at the target display dynamic range.

4. The method of claim 1 wherein upon determining that the target display dynamic range is equal to the graphics dynamic range:
applying a receiver display management process to the input video signal to generate a mapped video signal, wherein the display management process maps the input video signal from the video dynamic range to the target display dynamic range;
blending the graphics data with the mapped video signal to generate the composite video signal at the target display dynamic range; and
outputting the composite video signal.

5. The method of claim 1 wherein upon determining that the target display dynamic range is equal to the video dynamic range:
applying a receiver display management process to the input graphics data to generate mapped graphics data, wherein the display management process maps the input graphics data from the graphics dynamic range to the target display dynamic range;
blending the mapped graphics data with the input video signal to generate the composite video signal at the target display dynamic range; and
outputting the composite video signal.

6. The method of claim 1, wherein upon determining that the target display dynamic range is higher than the graphics dynamic range but lower than the video dynamic range:
applying a first receiver display management process to the input graphics data to generate mapped graphics data, wherein the first display management process maps the input graphics data from the graphics dynamic range to the target display dynamic range;
applying a second receiver display management process to the input video signal to generate a mapped video signal, wherein the second display management process maps the input video signal from the video dynamic range to the target display dynamic range;
blending the mapped graphics data with the mapped video signal to generate the composite video signal at the target display dynamic range; and
outputting the composite video signal.

7. The method of claim 1, further comprising:
determining whether the input video signal and/or the input graphics data are in a perceptually quantized IPT color space, and if not, converting the input video signal and/or the input graphics data from their original color space to the perceptually quantized IPT color space; and
performing blending in the perceptually quantized IPT color space.

8. The method of claim 7, wherein the IPT perceptual quantization is performed according to SMPTE ST 2084.

9. The method of claim 1, further comprising:
receiving input metadata;
generating blended signal metadata based on the input metadata; and
outputting the blended signal metadata.

10. The method of claim 9, wherein the input metadata comprise a maximum graphics brightness value for the input graphics data and a maximum video brightness value for the input video signal, and the blended signal metadata comprise a maximum blended video brightness value for the composite video signal, and generating the blended signal metadata comprises:
computing the maximum blended video brightness value as the maximum of the maximum graphics brightness value and the maximum video brightness value.

11. The method of claim 10, wherein the input metadata further comprise a minimum graphics brightness value and a minimum video brightness value, and the blended signal metadata comprise a minimum blended video brightness value, and generating the blended signal metadata comprises:
computing the minimum blended video brightness value as the minimum of the minimum graphics brightness value and the minimum video brightness value.

12. The method of claim 11, wherein the input metadata further comprise a mean video brightness value and the blended signal metadata comprise a mean blended video brightness value, and the mean blended video brightness value is set to be equal to the mean video brightness value.

13. The method of claim 9, wherein the input metadata comprise:
a minimum dynamic range for a video source display,
a maximum dynamic range for the video source display,
an average (mean) dynamic range for the video source display,
a minimum dynamic range for a graphics source display, and
a maximum dynamic range for the graphics source display, and the blended signal metadata comprise a maximum blended video brightness value, a minimum blended video brightness value, and an average blended video brightness value, and generating the blended signal metadata comprises:
computing the maximum blended video brightness value as the maximum of the maximum dynamic range for the video source display and the maximum dynamic range for the graphics source display;
computing the minimum blended video brightness value as the minimum of the minimum dynamic range for the video source display and the minimum dynamic range for the graphics source display; and
computing the average blended video brightness value as the average dynamic range for the video source display.

14. A non-transitory computer-readable storage medium having stored thereon computer-executable instruction for executing a method with a computer in accordance with claim 1.

* * * * *